April 11, 1961 G. REVEAL 2,979,301
CUP HOLDER
Filed March 27, 1958 2 Sheets-Sheet 1
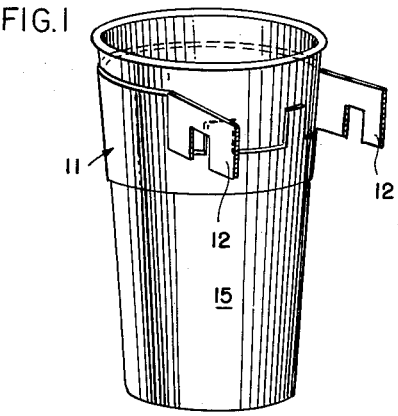
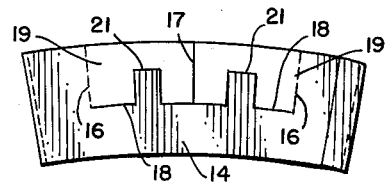
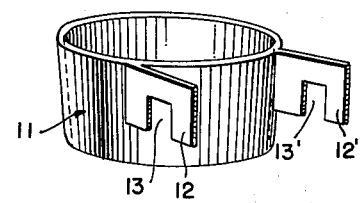
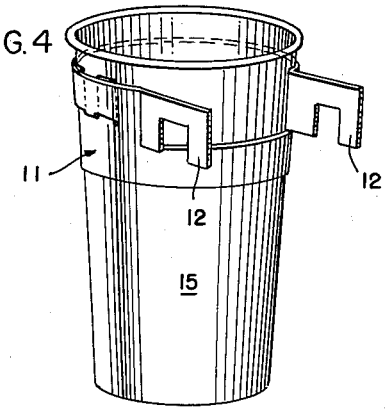
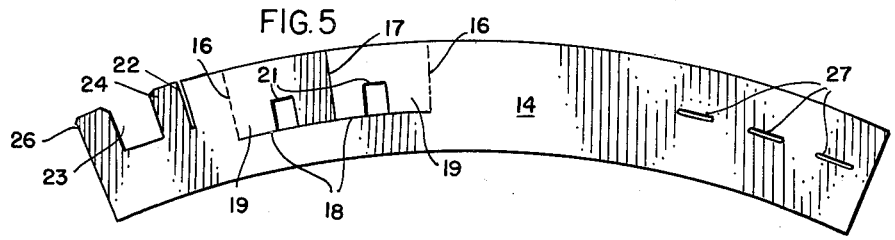
INVENTOR:
GORDON REVEAL
BY
ATT'YS April 11, 1961 G. REVEAL 2,979,301
CUP HOLDER
Filed March 27, 1958 2 Sheets-Sheet 2

INVENTOR:
GORDON REVEAL
BY
ATT'YS

United States Patent Office 2,979,301
Patented Apr. 11, 1961

2,979,301

CUP HOLDER

Gordon Reveal, 6512 W. 34th St., Berwyn, Ill.

Filed Mar. 27, 1958, Ser. No. 724,348

11 Claims. (Cl. 248—214)

This invention relates to disposable cup holders.

Present-day, tapered cylindrical cups are made of light-weight material such as heavy paper or a plastic composition. As a rule the heavy-weight paper cup is intended to be disposed of following one use. Such type of cups is used extensively for drive-in food and/or drink dispensaries, or picnics and similar outings.

At the drive-in food and/or beverage dispensaries disposable cups generally are used for beverages. In some instances cups also are used for certain kinds of food, as for example, French fried potatoes or potato chips. Where patrons desire to remain in their cars, trays may be provided, whereon to rest the food and/or drink, either for positioning on the car door or for holding in the patron's lap. Even when the trays are provided for hanging on the car door, they not always are level. Under such circumstances, or when the tray has to be positioned on the patron's lap, it is a bit precarious to attempt to maintain the cup of beverage on the tray. In cases where no tray is provided, one often has to manage a cup of beverage, a cup of food and, perhaps, another item of food, such as a sandwich, with no flat stable place whereon to rest the cup of beverage.

At picnics, or similar outings, where cylindrical cups, without integrated holder, are used to dispense beverages, an auxiliary form of holder for supporting the cup, even when merely drinking, would be most convenient. On other occasions, where plastic cups are used for serving very hot or ice-cold beverages, an inexpensive, one-use, removable holder will be found to be advantageous.

The main objects of this invention, therefore, are to provide an improved form of holder especially adapted for use with cylindrical cups made of light-weight material, like heavy paper or plastics; to provide an improved cup holder of this kind adapted to suspend the cup in a stable, vertical position from a narrow object; to provide an improved form of cup holder of this kind which may be permanently fixed on the cup or removably positioned on the cup at the time the cup is required for use; to provide an improved cup holder of this kind made from a narrow strip of comparatively-thin flexible material adapted to fit on the cup with an outwardly-disposed extension by which the cup may be held between the user's fingers or suspended from a narrow object; to provide an improved cup holder of this kind which is die-stamped from a flat, narrow strip of flexible material with slits and tongues and notched sections to permit the strip to be fixed in the form of a ring with the notched sections adapted to be outwardly disposed for seating over a narrow object to suspend the cup in stable vertical position or to be used as a finger grip; and to provide an improved cup holder of this kind which is so simple in form as to make its production extremely inexpensive and its positioning on and use with a cup very facile.

In the accompanying drawings:

Figure 1 is a perspective view of a cup positioned in one adaptation of a cup holder constructed in accordance with this invention;

Fig. 2 is a plan view of the holder shown in Fig. 1 in flat folded position before being placed on the cup;

Fig. 3 is a perspective view of a cup holder similar in form to that of Fig. 1 but made in non-collapsible form from plastic;

Fig. 4 is another perspective view of a cup positioned in another adaptation of a cup holder made in accordance with this invention;

Fig. 5 is a plan view of the holder of Fig. 4 before being formed into a ring to embrace the cup;

Figure 6:
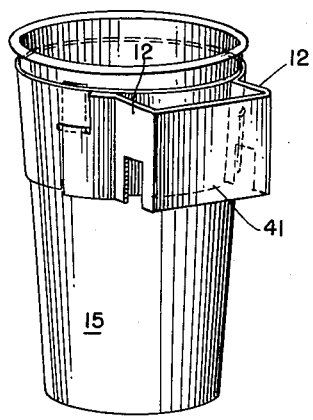
Fig. 6 is another perspective view of a cup positioned in still another adaptation of a cup holder made in accordance with this invention.

The essential concept of this invention involves a slightly tapered, flat-material ring with short outwardly-extending notched arms adapted to seat over the edge of a narrow object and suspend the attached cup in stable, vertical position, the preferred type of ring being formed at the time of desired use from a narrow, comparatively-thin, flexible strip die-stamped with scores, slits, tongues, and notched sections.

A cup holder embodying the foregoing concept comprises a ring 11, for embracing a cup, and having outwardly-extending, parallel arms 12 with notches 13 which permit seating the arms 12 over a narrow object to support the cup in a stable vertical position.

The most economical and easily-usable type of cup holder, embodying the foregoing concept, is formed from a strip 14 of comparatively-thin, narrow, flexible material with scores, slits, notches, and slots variously arranged in the strips to provide tongues and notched sections whereby the strip 14 may be looped and the ends variously attached in over-lapping relationship to form the ring 11 for embracing a cup 15 with the notched arms 12 outwardly-extending in substantially parallel relationship.

Four modifications of such a strip 14 are herein shown—Figs. 2, 5, 7, and 9—in the flat as they would be packed, and shipped to the point of use and there formed into the requisite rings wherein to support cups 15 for dispensing beverages, and on occasion certain types of food. These same four modifications of strip also are shown in use position each on a cup 15 in Figs. 1, 5, 7 and 9. These four forms of strip 14 presently will be described in that order.

Figure 10:
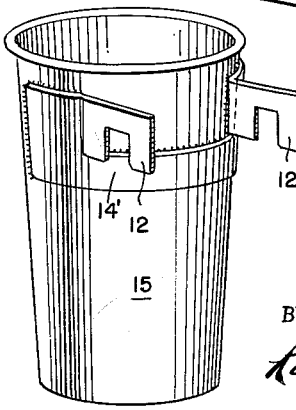
Fig. 10 is another perspective view of a cup showing attached thereto another adaptation of a cup holder made in accordance with this invention.

Two other forms of holders, not involving rings formed from looped strips 14, are shown in Figs. 3 and 10. The specific character of these modifications will be set forth subsequent to a description of the strip forms.

As Figs. 2, 5, 7, and 9 make quite obvious, all of the strip 14 adaptations are of arcuate form. This has the advantage of giving a slight taper to the ring 11, formed of the respective strip; a taper practically conforming with that of the type of cups for which this holder is primarily designed for use. The strips 14, shown in Figs. 2, 5, and 9, also have in common the arrangement of scores 16 and the transverse and longitudinal slits 17 and 18 which form the pairs of sections 19 disposed in space longitudinal alinement along one edge of the respective strips. Each of the sections 19 is cut out transversely of the strip 14, outwardly from the longitudinal slits 18, to form the rectangular-shaped notches 13. The form of strips 14 shown in Figs. 2 and 5 differs from the form of strip shown in Fig. 9, in that in the former the notched sections 19 are longitudinally opposed directly adjacent each other, whereas in the latter the notched sections 19 are oppositely disposed in spaced longitudinal alinement.

Obviously, the reason for these noted differences in the strips 14 of Figs. 2, 5, 7, and 9 is the varied means provided for attaching the overlapping ends of the strips to form the rings 11.

The strip 14 of Fig. 2 is designed to have the overlapping ends permanently bonded together by an adhesive, or by chance, by staples.

The strip 14 of Fig. 5 has a slit or slot 22 and a rectangular-shaped notch 23 extending transversely inward from one edge of the strip adjacently outward of the sections 19. This slit 22 and notch 23 form the tongues 24 and 26. The other end of the strip 14 has a series of longitudinally-alined slots 27 disposed nearly medially of the strip. Each of these slots is of a length very slightly in excess of the width of the tongues 24 and 26.

When it is desired to form a ring 11 from the strip form shown in Fig. 5, the strip 14 is looped and the ends overlapped to permit the tongues 24 and 26 to easily be inserted into a pair of slots 27. There being three of these slots 27 makes possible the forming of two different sizes of ring 11, with the strip 14 of Fig. 9, to accommodate two different sizes of cup 15.

Figure 9:
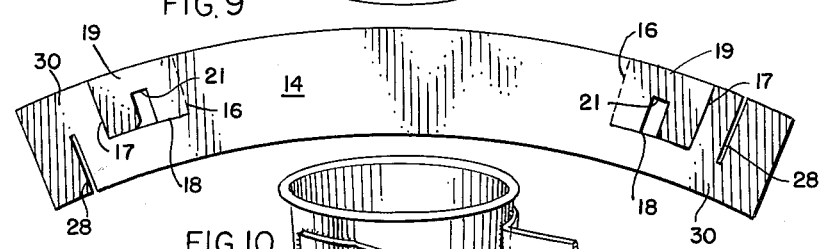
Fig. 9 is a plan view of the cup holder shown in Fig. 8 before it is formed into a ring to embrace the cup.

The strip 14 of Fig. 9 has a slot or slots 28 cut transversely inward about half way across the strip but from opposite lateral edges at opposite ends of the strip. These slots 28 are just enough greater in width than the thickness of the material from which the strip is made to permit the strip to easily be inserted into the respective slots 28.

When it is desired to form a strip 14 of Fig. 9 into a ring 11 the strip is looped with ends overlapping so that the portion 30 outwardly of one slot 28 enters into the slot in the opposite end. Preferably, the overlapping is made so that the ends of this strip, outwardly of the slots 28, are on the inside of the ring. This insures against the ends of the strip, outwardly of the slits 28, tending to protrude outwardly from the outer face of the ring intermediate the arms 12.

Figure 7:
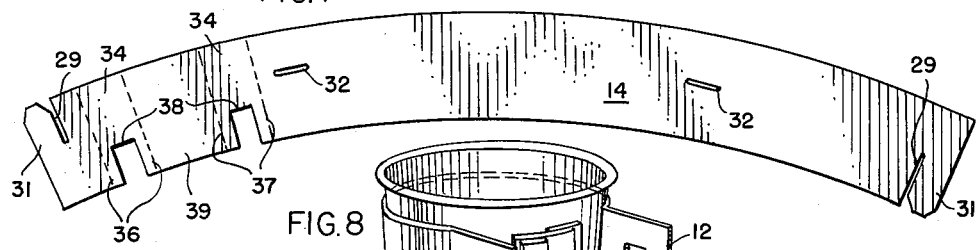
Fig. 7 is a plan view of the holder of Fig. 6 before being formed into a ring to embrace the cup.

The strip 14 of Fig. 7 is similar to the just-described strip 14 of Fig. 9 in that adjacent the opposite ends there are slits or slots 29 extending transversely inward about halfway from opposite lateral edges of the strip. However, in this instance the slots 29 are for the purpose of forming oppositely-disposed tongues 31 at the very opposite ends of the strip. Some distance inwardly from each end of the strip 14 are longitudinally-spaced and alined slots 32, disposed nearly medially of the strip. Each of these slots 32 is of a length sufficient to permit the easy insertion of the tongues 31. However, with the strip 14 of this Fig. 7, the notched sections 34 are differently formed from the comparable sections 19 of the strips of Figs. 2, 5, and 9.

The strip 14 of Fig. 7 has pairs of scores 36 and 37 extending transversely across the entire strip, adjacently-forward from one end thereof. The section 34, between the pairs of scores 36 and 37, have rectangular-shaped notches 38 extending inwardly of the strip about half the width of the strip. The section 39, between the sections 34, forms a connected spacer 41 for maintaining the arms 12 in parallel relationship when the strip is formed into a ring and placed on a cup, as is most apparent from Fig. 6.

When it is desired to form a ring 11 from a strip 14 of Fig. 7, the strip is first bent oppositely of the form of Fig. 7, along the respective pairs of scores 36 and 37. The strip is then looped with the ends overlapping to permit the insertion of the tongues 31 into the respective slots 32, as so clearly shown in Fig. 6. Thereupon, the sections 34 extending outwardly parallel to form the arms 12 will be retained in such parallel relationship by the spacer 41.

A cup holder embodying the basic concept of this invention may be in either of two forms different from those just described.

Fig. 3 shows a permanent ring 11 made of molded plastic. The arms 12' are formed integral with the ring 11 to extend outwardly parallel just as in any of the strip forms of holders previously described. The arms 12' are formed with notches 13', as with the other adaptations.

Fig. 10 shows a short strip 14' of a length about half the circumference of the cup 15, adjacent the open end, wherewith it is to be used as a holder. This strip 14' is scored, slit and notched just as are any of the strips 14 shown in Figs. 2 and 5. However, this form of holder is adapted to have the strip 14' permanently adhered to the cup 15. The sections comparable with sections 19 of the strips of Figs. 2, 5, and 9 normally lie flat against the cup 15. When the cup is to be used, these sections are pulled outwardly to form parallel arms 12' just as with the other herein-described form of cup holders.

These various adaptations of cup holder would be used respectively as follows:

The form shown in Fig. 2 would be opened from its flat position and set over a cup 15. The sections 19 would be bent outwardly to form the parallel arms 12 as shown in Fig. 1.

The strip form shown in Fig. 5 would be looped with the ends overlapping and the tongues 24 and 26 inserted into the respective slots 37 to form a ring 11. Upon being placed over a cup 15, the sections 19 would be bent outwardly into substantially parallel relationship as shown in Fig. 4.

The form of strip shown in Fig. 7, first would be oppositely bent along the pairs of scores 36 and 37 and then looped with the ends overlapping to permit the tongues 31 to be inserted into the slots 32 to form the ring 11. Upon placing the ring over the cup sections 34 automatically would be disposed as parallel arms 12 and retained in such parallel relationship by the spacer section 39, as shown in Fig. 6.

Figure 8:
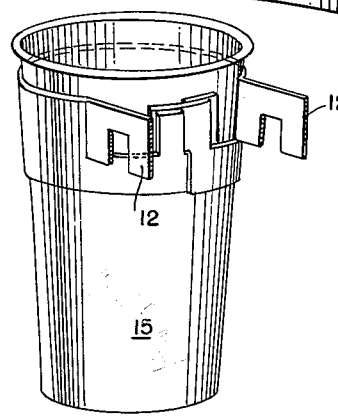
Fig. 8 is another perspective view of a cup positioned in another adaptation of a cup holder made in accordance with this invention.

The strip 14 shown in Fig. 9 would be looped with the ends overlapping and respectively inserted through the registering slots 28, as shown in Fig. 8, thereby forming the desired ring 11. Upon setting the ring over a cup 15, the sections 19 would be bent outwardly to form substantially parallel arms 12, as shown in Fig. 8.

A cup 15, set in any of the foregoing adaptations, being filled with the ordered beverage—or, in certain instances with items of food—would be brought out to the vehicle wherein the ordering patrons are seated. Where it is desired to have the cup temporarily set aside while one's hands are being used otherwise, the notches 13 in the arms 12 may be set over the upper edge of a lowered or partially-lowered car window. So set on the window, the cup 15 would be suspended in a stable vertical position against any accidental spilling of the contents of the cup.

As will be quite apparent, any of the adaptations of holders set over a cup 15—whether of the one-use disposable type, or the repeated use type—the arms 12 may be used to hold the cup in the hand. This can be done by merely gripping the arms 12 between the index finger and the opposed thumb on one side and the next adjacent finger on the opposite side.

It is to be understood that details of this invention may be altered or omitted without departing from the spirit of this invention as defined by the following claims.

I claim:

1. A cup holder in the form of a cup-embracing flexible strip of thin flat material scored and notched to form a pair of integral circumferentially-spaced inwardly-notched sections within the lateral edges of the material bent on the scores to form outwardly-extending parallel arms, the strip being embracively positionable adjacent the open end of a cup to permit the outwardly-extending notched arms to seat over a narrow object to suspend a cup in a vertical position.

2. A cup holder in the form of a cup-embracing, narrow, thin, flat, flexible strip transversely scored and formed with a pair of circumferentially-spaced rectangularly-shaped notched sections within the lateral edges of the strip, the strip having the ends attached in overlapping relationship to constitute a slightly-tapered ring to removably embrace a cup with the notched sections bent on the scores to dispose the sections as outwardly-extending parallel arms to permit the notches to seat over the edge of a narrow object and suspend the embraced cup in a vertical position.

3. A cup holder in the form of a cup-embracing, narrow, thin, flat, flexible strip transversely scored and slit part way inwardly from one edge at predetermined circumferentially-spaced distances to form a pair of outwardly-extending sections within the lateral edges of the strip each of the sections having a notch extending transversely inward from one edge, the strip having the ends attached in overlapping relationship to constitute a ring to removably embrace a cup with the sections bent on the scores to dispose the sections as outwardly-extending parallel arms to permit the notches to seat over the edge of a narrow object and suspend the embraced cup in vertical position.

4. A cup holder in the form of a cup embracing, narrow, thin, flat, flexible strip transversely scored and slit part way inwardly from one edge at predetermined circumferentially-spaced distances to form a pair of outwardly-extending sections within the lateral edges of the strip each of the sections having a notch extending transversely inward from one edge, the strip having the ends attached in overlapping relationship to constitute a slightly-tapered ring to removably embrace a cup with the sections bent on the scores to dispose the sections as outwardly-extending parallel arms to permit the notches to seat over the edge of a narrow object and suspend the embraced cup in vertical position.

5. A cup holder in the form of a cup embracing, narrow, thin, flat, flexible strip transversely scored and slit part way inwardly from one edge at predetermined circumferentially spaced distances to form a pair of opposed outwardly extending sections within the lateral edges of the strip each of the sections having a notch extending transversely inward from one edge, the strip having the ends attached in overlapping relationship to constitute a ring to removably embrace a cup with the sections bent on the scores to dispose the sections as outwardly-extending parallel arms to permit the notches to seat over the edge of a narrow object and suspend the embraced cup in vertical position.

6. A cup holder in the form of a cup embracing, narrow, thin, flat, flexible strip transversely scored and slit part way inwardly from one edge at predetermined circumferentially spaced distances to form a pair of oppositely-disposed outwardly-extending sections within the lateral edges of the strip each of the sections having a notch extending transversely inward from one edge, the strip having the ends attached in overlapping relationship to constitute a ring to removably embrace a cup with the sections bent on the scores to dispose the sections as outwardly-extending parallel arms to permit the notches to seat over the edge of a narrow object and suspend the embraced cup in vertical position.

7. A cup holder in the form of a cup embracing, narrow, thin, flat, flexible strip transversely scored and slit part way inwardly from one edge at predetermined circumferentially-spaced distances to form a pair of outwardly-extending sections within the lateral edges of the strip each of the sections having a notch extending transversely inward from one edge thereof, the strip having the ends attached in overlapping relationship to constitute a ring to removably embrace a cup with the sections bent on the scores to dispose the sections as outwardly-extending parallel arms to permit the notches to seat over the edge of a narrow object and suspend the embraced cup in vertical position.

8. A cup holder in the form of a cup embracing, narrow, thin, flat, flexible strip transversely scored and slit part way inwardly from one edge at predetermined circumferentially-spaced distances to form a pair of outwardly-extending sections within the lateral edges of the strip each of the sections having a notch extending transversely inward from one edge, one end of the strip being transversely slit and notched inwardly from one edge to form a pair of tongues, the other end of the strip having a series of longitudinally-spaced slots receiving the tongues to hold the strip ends in overlapping relationship to constitute a ring to removably embrace a cup with the sections bent on the scores to dispose the sections as outwardly-extending parallel arms to permit the notches to seat over the edge of a narrow object to suspend the embraced cup in a vertical position.

9. A cup holder in the form of a cup embracing, narrow, thin, flat, flexible strip transversely scored and slit part way inwardly from one edge at predetermined circumferentially-spaced distances to form a pair of outwardly-extending sections within the lateral edges of the strip each of the sections having a notch extending transversely inward from one edge, opposite ends of the strip having transverse slits extending part way inward from opposite edges, the strip being overlapped with the slits interfitting to constitute a ring to removably embrace a cup with the sections bent on the scores to dispose the sections as outwardly-extending parallel arms to permit the notches to seat over the edge of a narrow object to suspend the embraced cup in a vertical position.

10. A cup holder in the form of a cup embracing, narrow, thin, flat, flexible strip having pairs of circumferentially-spaced scores extending transversely across the strip, the strip having rectangularly-shaped notches cut out transversely inwardly from one edge of the sections between the two outermost scores and between the two innermost scores respectively, opposite ends of the strip having transversely-disposed slits extending part way inwardly from the opposite lateral edges to form oppositely-disposed tongues inwardly from each end, the strip also having longitudinally-alined slots spaced inwardly from each end, the strip having the ends attached in overlapping relationship by the insertion of the tongues in the respective slots to constitute a ring to removably embrace a cup with the two notched sections between the respective pairs of scores bent on the scores to dispose the sections as outwardly-extending parallel arms retained parallel by the section of the strip between the two notched sections and thereby permit the notches to seat over the edge of a narrow object to suspend the embraced cup in a vertical position.

11. A cup holder in the form of a cup embracing, narrow, thin, flat, flexible strip transversely scored and slit part way inwardly from one edge at predetermined circumferentially-spaced distances to from a pair of outwardly-extending sections within the lateral edges of the strip each of the sections having a notch extending transversely inward from one edge, the strip being embracively positionable adjacent the open end of a cup and permit the notched sections to be bent on the scores to dispose the sections as outwardly-extending parallel arms and permit the notches to seat over a narrow object and suspend the cup in a vertical position.

References Cited in the file of this patent
UNITED STATES PATENTS

| | | |
|---|---|---|
| 1,609,721 | Husted | Dec. 7, 1926 |
| 1,723,944 | Marsh | Aug. 6, 1929 |
| 1,736,961 | Alvensleben | Nov. 26, 1929 |
| 1,795,615 | Parran | Mar. 10, 1931 |
| 1,866,805 | Haywood | July 12, 1932 |
| 1,983,060 | Zuckerman | Dec. 4, 1934 |
| 2,506,160 | Martin | May 2, 1950 |
| 2,615,238 | Highwood | Oct. 28, 1952 |
| 2,706,100 | Thomason | Apr. 12, 1955 |